(12) United States Patent
Stevens et al.

(10) Patent No.: US 7,511,858 B2
(45) Date of Patent: Mar. 31, 2009

(54) METHOD FOR PRINTING A VISUAL PRINTER CALIBRATION TEST PATTERN

(75) Inventors: Michael D. Stevens, Portland, OR (US); Audrey A. Lester, Sherwood, OR (US)

(73) Assignee: Xerox Corporation, Norwalk, CT (US)

(*) Notice: Subject to any disclaimer, the term of this patent is extended or adjusted under 35 U.S.C. 154(b) by 793 days.

(21) Appl. No.: 11/013,017

(22) Filed: Dec. 14, 2004

(65) Prior Publication Data
US 2006/0126135 A1     Jun. 15, 2006

(51) Int. Cl.
*H04N 1/40* (2006.01)
*H04N 1/46* (2006.01)

(52) U.S. Cl. .................. 358/3.24; 358/3.21; 358/504; 358/518

(58) Field of Classification Search ............. 358/1.9, 358/406, 504, 518, 521, 3.21, 3.24; 382/162, 382/167
See application file for complete search history.

(56) References Cited

U.S. PATENT DOCUMENTS

| 5,121,196 | A  | * | 6/1992  | Hung ..................... 358/504  |
| 5,537,516 | A  | * | 7/1996  | Sherman et al. ........... 358/1.9  |
| 6,975,426 | B2 | * | 12/2005 | Kuno et al. ............... 358/1.2  |
| 7,031,025 | B1 | * | 4/2006  | He et al. .................. 358/3.09 |

OTHER PUBLICATIONS

Frank Preucil, Zenon Elyjiw, Robert F. Reed; "The GATF Dot Gain Scale"—GATF Research Progress No. 69; Nov. 1965, pp. 1-4.

* cited by examiner

*Primary Examiner*—James A Thompson
(74) *Attorney, Agent, or Firm*—Fay Sharpe LLP

(57) ABSTRACT

A method of printing a test pattern including printing cyan or magenta in a test region using a default printer half-tone, printing a yellow in a reference area portion of the test region using a coarse clustered dot half-tone, and printing different levels of yellow in test patch regions of the test region using a default printer half-tone.

10 Claims, 3 Drawing Sheets

METHOD FOR PRINTING A VISUAL PRINTER CALIBRATION TEST PATTERN

BACKGROUND

The subject disclosure is generally directed to color printing.

Color printers commonly employ a plurality of inks of different primary colors to generate a spectrum of colors. For example, many color printers use four ink colors: cyan (C), magenta (M), yellow (Y) and black (K). Color images are formed on a receiving substrate or medium by placing combinations of zero or more dots of C, M, Y or K ink at each pixel location. Cyan, magenta and yellow are typically employed since a wide range of colors can be produced by different combinations of these inks.

A color printer can be visually color calibrated by use of test patterns that include reference areas and test patches. However, it can be difficult to determine which patch most closely visually matches a reference area.

DETAILED DESCRIPTION

Figure 1:
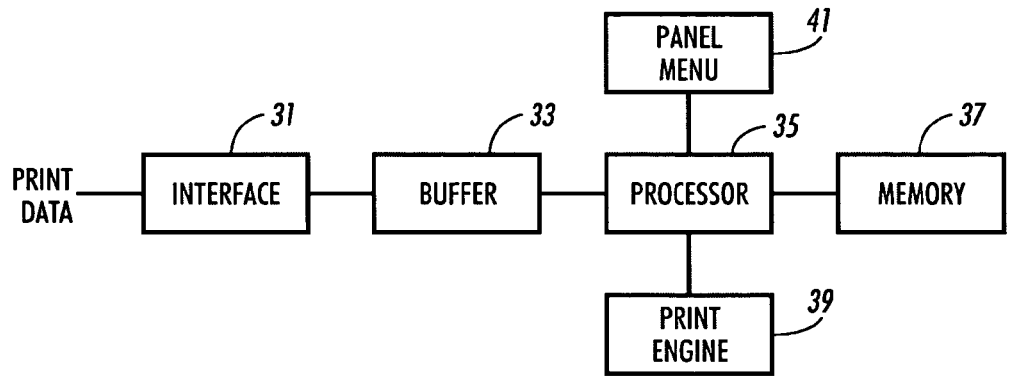
FIG. 1 is a schematic block diagram of an embodiment of a printing apparatus.

FIG. 1 is a schematic block diagram of an embodiment of a printing apparatus or printer that can comprise a printing portion of a multi-function device and includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit map raster data generated by the processor 35. The print engine 39 can be an electrophotographic print engine or an ink jet print engine, for example. The printer can further include a panel menu 41 for receiving inputs from a user, for example. The panel menu can include a display and a keypad, and/or a touchscreen, for example.

Figure 2:
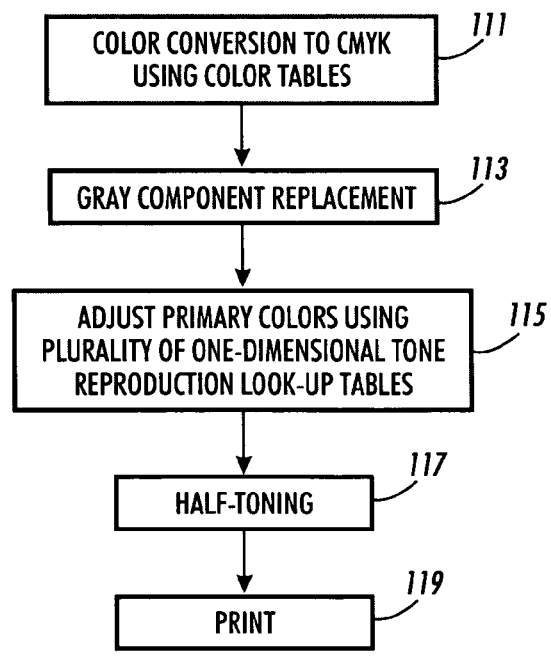
FIG. 2 is a schematic diagram of an embodiment of an image processing pipeline.

FIG. 2 is a block diagram of an embodiment of a portion of an image processing pipeline for a color printer. At 111 input color data is transformed to printer color space such as CMYK which employs the primary colors of cyan, magenta, yellow and black, for example using color tables. At 113 gray component replacement is performed on printer primary color data, wherein some amounts of the non-black primary colors are replaced with black. At 115 the primary colors are adjusted using one-dimensional tone reproduction curves (TRCs), for example one TRC for each primary. At 117 half-toning is performed, and at 119 printing takes place. The one-dimensional TRCs employed in the disclosed embodiments can be implemented as one-dimensional look-up tables, for example.

The adjustments at 115 can be employed to calibrate the printing apparatus, for example. For ease of reference, the embodiments disclosed herein employ C, M, Y, K primary colors.

Figure 3:
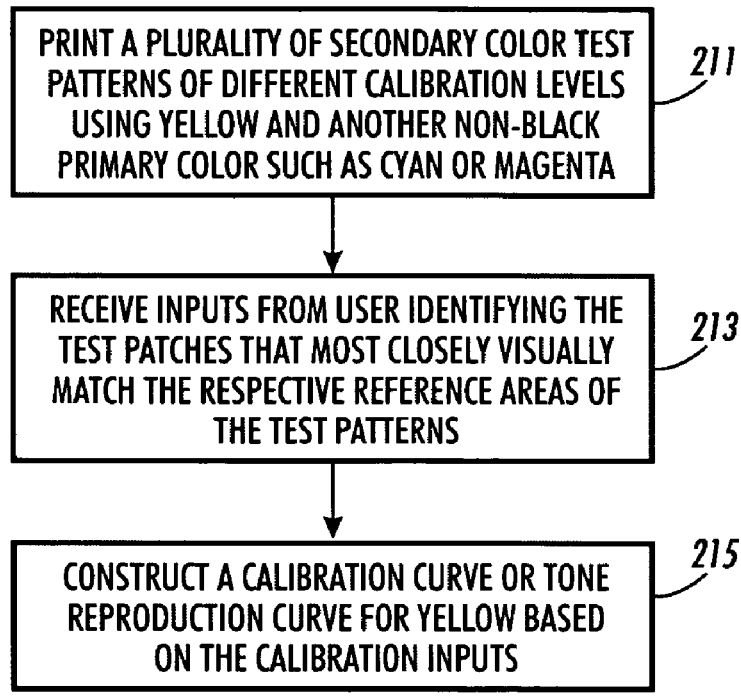
FIG. 3 is a schematic flow diagram of an embodiment of a procedure for calibrating a printer as to the printing of yellow.

FIG. 3 is a schematic flow diagram of an embodiment of a procedure for adjusting or calibrating a color printer as to printing yellow. At 211 the printer prints a plurality of secondary color test patterns of different calibration levels using yellow and another primary color of the primary color system utilized by the printer, such as cyan or magenta for the secondary colors of green or red. Each secondary color test pattern includes a secondary color reference area and a plurality of secondary color test patches of different hues of the secondary color. At 213 the printer receives inputs from a user identifying the test patches that to the user most closely visually match the respective reference areas of the test patterns, for example via a panel menu. At 215 the printer constructs a calibration curve or tone reproduction curve for yellow based on the calibration inputs.

Figure 4:
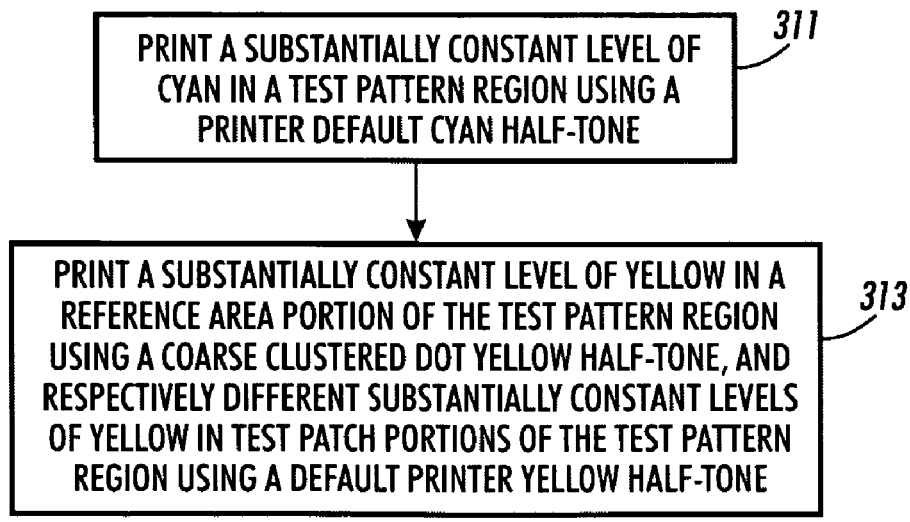
FIG. 4 is a schematic flow diagram of an embodiment of a procedure for printing a green test pattern using cyan and yellow that can be employed in the procedure of FIG. 3.

FIG. 4 is a schematic flow diagram of an embodiment of a procedure for printing a green test pattern 70 (FIG. 5) that can be employed in the procedure of FIG. 3. At 311 a substantially constant level of cyan, for example calibrated, is printed in a test pattern region 71 (FIG. 5) using a printer default cyan half-tone. At 313 a substantially constant level of yellow is printed in a reference area portion 73 (FIG. 5) of the test pattern region 71 using a coarse clustered dot half-tone, and respectively different substantially constant levels of yellow are printed in test patch portions 75 (FIG. 5) of the test pattern region 71 using a default printer yellow half-tone. The default printer yellow half-tone has a frequency higher than the coarse clustered dot yellow half-tone, and the coarse clustered dot yellow half-tone is less susceptible to dot-gain changes than the default printer yellow half-tone. The default printer cyan half-tone can also have a frequency higher than the relatively coarse clustered dot yellow half-tone which can be a round clustered dot half-tone. By way of illustrative example, a printer default half-tone can have a frequency in the range of about 130 to 200 clusters per inch, while a clustered dot half-tone can have a frequency in the range of about 50 to about 70 clusters per inch. The default printer cyan half-tone and the coarse clustered dot yellow half-tone printed in the reference portion 73 of the test area can be at the same substantially constant level.

Figure 5:
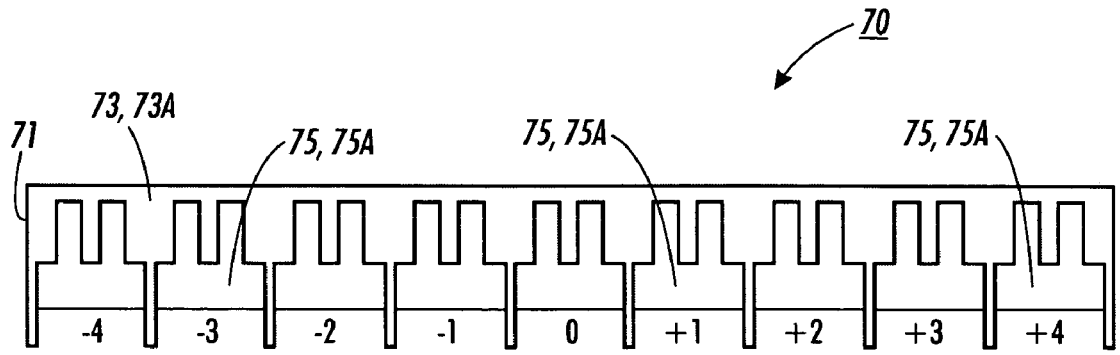
FIG. 5 is a schematic illustration of an embodiment of a test pattern that can be printed by the procedure of FIG. 4.

Referring also to FIG. 5, the foregoing prints a test pattern that includes a green reference area 73A and a plurality of green test patches 75A of different hues of green, wherein the green reference area 73A and the plurality of green test patches 75A include a substantially constant level of cyan printed using a printer default cyan half-tone, wherein the green reference area 73A includes a substantially constant level of yellow printed using a coarse clustered dot half-tone, and the green test patches 75A include respectively different substantially constant levels of yellow printed using a printer default yellow half-tone. By way of illustrative example, the level of yellow printed using a printer default yellow half-tone can increase in steps from one end of the pattern to the other end of a pattern, and test patch identifiers that range from a negative number (e.g., −4) at one end of the test pattern to a positive number (e.g., +4) at the other end can be provided to indicate that the level of yellow increases from the −4 green test patch to the +4 green test patch. For convenience, a generally centrally located 0 green test patch includes yellow printed using a printer default yellow half-tone at a currently calibrated level that corresponds the predetermined calibration level at which the coarse half-tone yellow was printed. It should be appreciated that other position identifiers such as A, B, C, etc. can be employed.

By way of illustrative example, each green test patch 75A can be generally fork shaped with a rectangular base portion adjacent a lower edge of the test pattern, and with prongs or teeth extending upwardly from the rectangular base portion. Also, the rectangular base portions of the green test patches 75A can be separated along the lower edge of the test pattern by narrow portions of the reference area 73A that are narrower than the rectangular base portions of the test patches 75A. Still further, the narrow portions of the reference area 73A between the base portions of the test patches 75A can extend downwardly beyond the lower edge of the test pattern.

The green test pattern can also be considered as a yellow test pattern that is printed with a substantially uniform field of default half-tone cyan that can be considered as a background color for the yellow test pattern.

The sequence in which cyan and yellow are printed, for example onto a sheet of paper, can be cyan followed by yellow, or yellow followed by cyan, for example in an electrophotographic printer. Also, cyan and yellow can be printed generally concurrently, for example in an ink jet printer.

Figure 6:
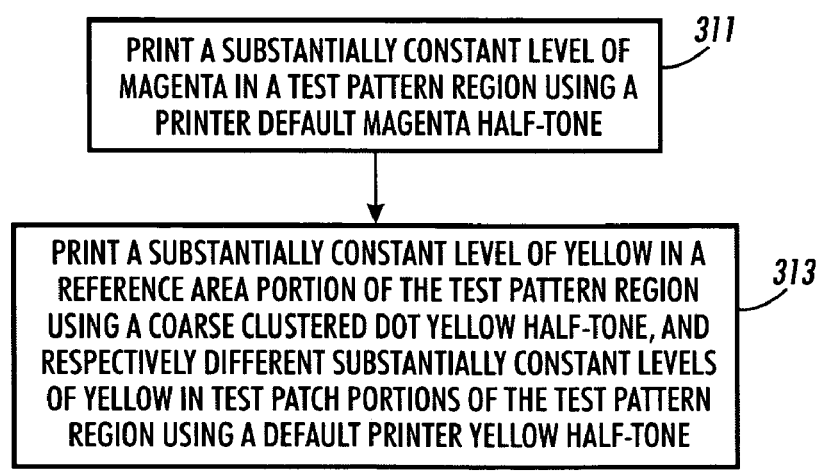
FIG. 6 is a schematic flow diagram of an embodiment of a procedure for printing a red test pattern using magenta and yellow that can be employed in the procedure of FIG. 3.

It should be appreciated that red test patterns comprising magenta and yellow can also be employed to calibrate yellow, and FIG. 6 is a schematic flow diagram of a procedure for printing a red test pattern that can be employed in the procedure of FIG. 3. The red test pattern can be substantially similar to the green test pattern of FIG. 4.

Printing green test patterns comprising cyan and yellow fields or red test patterns comprising magenta and yellow fields can make it easier to visually identify test patches that match a reference area. More generally, yellow can be calibrated by using test patterns of a secondary color that comprises yellow and a non-yellow, non-black primary color of the particular primary color system utilized by the printer being calibrated.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of printing a test pattern, comprising:
   printing a test pattern region with a predetermined substantially constant level of cyan using a default printer cyan half-tone;
   printing a reference area portion of the test pattern region with a predetermined substantially constant level of yellow using a clustered dot yellow half-tone;
   printing test patch portions of the test pattern region with respectively different substantially constant levels of yellow using a default printer yellow half-tone, wherein each of the test patch portions is generally fork shaped, the default printer yellow half-tone has a frequency that is higher than the frequency of the clustered dot yellow half-tone, and whereby each test patch portion includes yellow printed at a respective substantially constant level.

2. The method of claim 1 wherein:
   printing a test pattern region with a predetermined substantially constant level of cyan comprises electrophotographically printing a test pattern region with a predetermined substantially constant level of cyan using a default printer cyan half-tone;
   printing a reference area portion of the test pattern region with a predetermined substantially constant level of yellow comprises electrophotographically printing a reference area portion of the test pattern region with a predetermined substantially constant level of yellow using a clustered dot yellow half-tone;
   printing test patch portions of the test pattern region with respectively different substantially constant levels of yellow comprises electrophotographically printing test patch portions of the test pattern region with respectively different substantially constant levels of yellow using a default printer yellow half-tone, wherein the default printer yellow halt-tone has a frequency that is higher than the frequency of the clustered dot yellow half-tone, and whereby each test patch portion includes yellow printed at a respective substantially constant level.

3. The method of claim 1 wherein the substantially constant level of cyan printed using a default printer half-tone and the substantially constant level of yellow printed using a clustered dot yellow half-tone are substantially equal.

4. The method of claim 1 wherein the default printer cyan half-tone has a higher frequency than the clustered dot yellow half-tone.

5. A method of printing a test pattern comprising:
   printing a test pattern region with a predetermined substantially constant level of magenta using a default printer magenta half-tone;
   printing a reference area portion of the test pattern region with a predetermined substantially constant level of yellow using a clustered dot yellow half-tone;
   printing test patch portions of the test pattern region with respectively different substantially constant levels of yellow using a default printer yellow half-tone, wherein each of the test patch portions is generally fork shaped, the default printer yellow half-tone has a frequency that is higher than the frequency of the clustered dot yellow half-tone, and whereby each test patch portion includes yellow printed at a respective substantially constant level.

6. The method of claim 5 wherein:
   printing a test pattern region with a predetermined substantially constant level of magenta comprises electrophotographically printing a test pattern region with a predetermined substantially constant level of magenta using a default printer magenta half-tone;
   printing a reference area portion of the test pattern region with a predetermined substantially constant level of yellow comprises electrophotographically printing a reference area portion of the test pattern region with a predetermined substantially constant level of yellow using a clustered dot yellow half-tone;
   printing test patch portions of the test pattern region with respectively different substantially constant levels of yellow comprises electrophotographically printing test patch portions of the test pattern region with respectively different substantially constant levels of yellow using a default printer yellow half-tone, wherein the default printer yellow half-tone has a frequency that is higher than the frequency of the clustered dot yellow half-tone, and whereby each test patch portion includes yellow printed at a respective substantially constant level.

7. The method of claim 5 wherein the substantially constant level of magenta printed using a default printer half-tone and the substantially constant level of yellow printed using a clustered dot yellow half-tone are substantially equal.

8. The method of claim 5 wherein the default printer magenta half-tone has a higher frequency than the clustered dot yellow half-tone.

9. A method of calibrating a printer comprising:

printing a plurality of green test patterns using cyan and yellow, wherein each test pattern includes a green reference area and a plurality of green test patches of different hues of green, and wherein the green reference area and the green test patches include cyan printed at a substantially constant level using a default printer cyan half-tone, wherein the green reference area further includes yellow printed at a substantially constant level using a clustered dot yellow half-tone, wherein the default printer yellow halftone has a higher frequency than the clustered dot yellow halftone and wherein green test patches include yellow printed at respectively different substantially constant levels of yellow using a default printer yellow half-tone;

receiving inputs from a user as to which test patch most closely matches a respective reference area;

using the inputs to generate a calibration curve for yellow.

10. A method of calibrating a printer comprising:

printing a plurality of red test patterns using magenta and yellow, wherein each test pattern includes a red reference area and a plurality of red test patches of different hues of red, and wherein the red reference area and the red test patches include magenta printed at a substantially constant level using a default printer magenta half-tone, wherein the red reference area further includes yellow printed at a substantially constant level using a clustered dot yellow half-tone, wherein the default printer yellow half-tone has a higher frequency than the clustered dot yellow half-tone, and wherein red test patches include yellow printed at respectively different substantially constant levels of yellow using a default printer yellow half-tone, and;

receiving inputs from a user as to which test patch most closely matches a respective reference area;

using the inputs to generate a calibration curve for yellow.

* * * * *